US011479067B2

(12) United States Patent
Rimai et al.

(10) Patent No.: US 11,479,067 B2
(45) Date of Patent: Oct. 25, 2022

(54) SYSTEMS AND METHODS FOR MONITORING A TIRE FOR A PUNCTURE

(71) Applicant: Bridgestone Americas Tire Operations, LLC, Nashville, TN (US)

(72) Inventors: Benjamin E. Rimai, Copley, OH (US); Bradley S. Plotner, Canton, OH (US); Jared J. Griebel, Orange Village, OH (US); Cameron L. Reynolds, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 152 days.

(21) Appl. No.: 16/607,384

(22) PCT Filed: May 3, 2018

(86) PCT No.: PCT/US2018/030758
§ 371 (c)(1),
(2) Date: Oct. 23, 2019

(87) PCT Pub. No.: WO2018/208567
PCT Pub. Date: Nov. 15, 2018

(65) Prior Publication Data
US 2020/0130434 A1 Apr. 30, 2020

Related U.S. Application Data

(60) Provisional application No. 62/504,578, filed on May 11, 2017.

(51) Int. Cl.
*B60C 23/06* (2006.01)
*G01M 3/40* (2006.01)
(Continued)

(52) U.S. Cl.
CPC ............ *B60C 23/064* (2013.01); *B60C 23/06* (2013.01); *G01M 3/40* (2013.01); *B60C 19/12* (2013.01);
(Continued)

(58) Field of Classification Search
None
See application file for complete search history.

(56) References Cited

U.S. PATENT DOCUMENTS 1,096,526 A 5/1914 Brunig
4,031,508 A 6/1977 Omori
(Continued)

FOREIGN PATENT DOCUMENTS

CN 202448690 U 9/2012
CN 103921630 A 7/2014
(Continued)

OTHER PUBLICATIONS

Machine translation of EP0537607A1 published on Apr. 21, 1993 owned by David Myatt.
(Continued)

*Primary Examiner* — Jill E Culler

(57) ABSTRACT

This disclosure relates to an approach for monitoring a tire for a puncture based on a change in a voltage established based on a resistance of a material disposed within the tire. In one example, the material is a conductive material layer. In another example, the material is a resistive strip. The systems and methods described herein can monitor for a change in an established voltage over time that is a function of parameters including the resistance of the conductive material layer or the resistive strip, and an applied voltage, to provide an indication of the change in the resistance in the material. The change in resistance of the material can be indicative of the puncture within the tire. The systems and
(Continued)

methods described herein can alert a vehicle operator of the puncture within the tire.

18 Claims, 4 Drawing Sheets

(51) Int. Cl.
*G01N 27/00* (2006.01)
*B60C 19/00* (2006.01)
*B60C 19/12* (2006.01)

(52) U.S. Cl.
CPC ...... *B60C 2019/004* (2013.01); *G01N 27/002* (2013.01)

(56) References Cited

U.S. PATENT DOCUMENTS

| | | | |
|---|---|---|---|
| 4,067,288 A | 1/1978 | Saito et al. | |
| 5,348,067 A | 9/1994 | Myatt | |
| 5,520,231 A | 5/1996 | Myatt | |
| 6,470,933 B1 | 10/2002 | Volpi | |
| 8,212,690 B1* | 7/2012 | Partin | B60C 9/0007 340/941 |
| 10,899,181 B2* | 1/2021 | Dennes | B60C 23/0493 |
| 2003/0201044 A1* | 10/2003 | Schick | B60C 11/24 152/152.1 |
| 2010/0011852 A1 | 1/2010 | Andonian et al. | |
| 2013/0134992 A1 | 5/2013 | Zhu et al. | |

FOREIGN PATENT DOCUMENTS

| | | |
|---|---|---|
| DE | 102015207379 A1 | 10/2016 |
| DE | 102008053506 | 9/2020 |
| EP | 0537607 A1 | 4/1993 |
| EP | 1970223 B1 | 7/2010 |
| JP | 3274505 B2 | 4/2002 |
| JP | 2003226120 A | 8/2003 |
| JP | 2006021691 A | 1/2006 |

OTHER PUBLICATIONS

Extended European Search Report dated Dec. 11, 2020 in related EP Pat. App. No. 18798182.4.
First Office Action dated Feb. 3, 2021 in related CN Pat. App. No. 201880030957.7.
Notice of Reasons for Rejection dated Nov. 24, 2020 in related JP Pat. App. No. 2019-561717.

\* cited by examiner

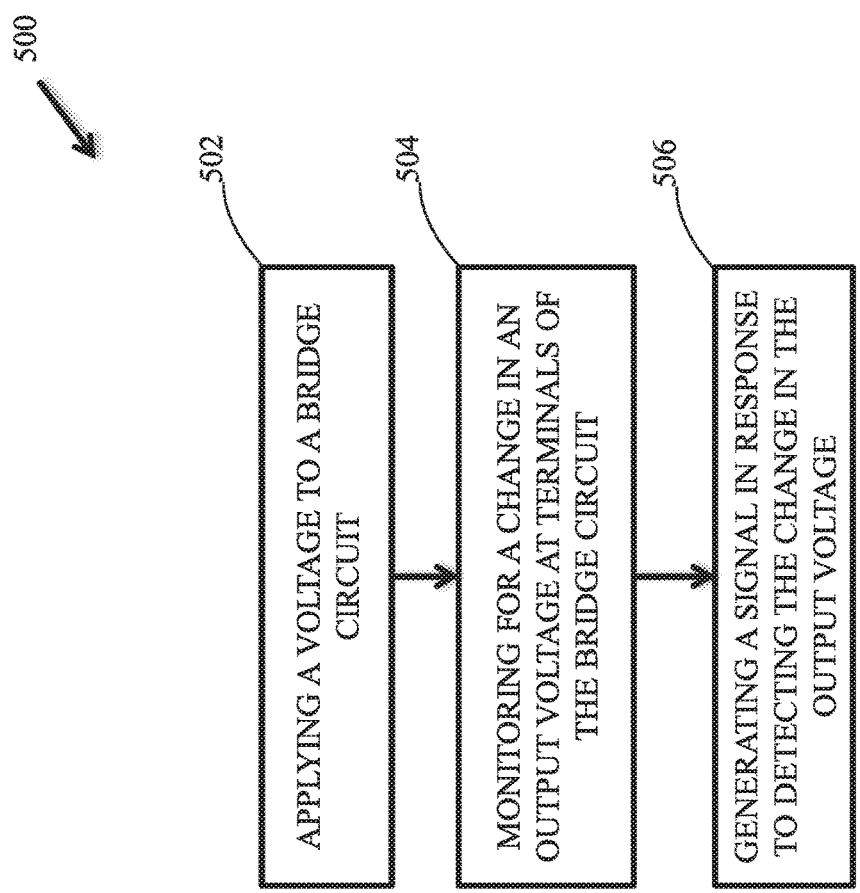

SYSTEMS AND METHODS FOR MONITORING A TIRE FOR A PUNCTURE

TECHNICAL FIELD

This disclosure generally relates to monitoring a condition of a tire. More specifically, this disclosure relates to systems and methods for monitoring a tire for a puncture.

BACKGROUND

There are several reasons why a tire may become flat over its lifetime. One of the most common is punctures caused by running over a foreign object, such as a nail, wire, razor blade, broken glass, wood, or the like. Furthermore, when a self-sealing tire self-seals there is no indication of whether the self-sealing tire successfully sealed itself. Thus, the foreign object lodged in the self-sealing tire is unlikely to be removed, and the void filled. Therefore, awareness of when a tire has been punctured by a foreign object is important for a vehicle operator and the performance of the tire itself.

SUMMARY

In one example, a system can include a tire that can include a conductive material layer. The system can further include a bridge circuit. The bridge circuit can include a plurality of branches that can have a plurality of resistors. The conductive material layer of the tire can correspond to one of the plurality of resistors of a branch. The bridge circuit can be configured to generate an output voltage at output terminals. The output voltage at the output terminals can be a function of parameters comprising a voltage applied to the bridge circuit and a resistance of the conductive material layer. The system can further include a sensor that can be configured to monitor for the change in the output voltage at the output terminals. The change in the output voltage at the output terminals can be indicative of a change in the resistance of the conductive material layer.

In another example, a system can include a resistive strip that can be arranged on a material layer that can be disposed within a tire. The system can further include a power supply that can be configured to apply a voltage to the resistive strip arranged on the layer disposed within the tire to establish a voltage in the resistive strip. The system can further include a sensor that can be configured to monitor for a change in the voltage in the resistive strip. The change in the voltage in the resistive strip can be indicative of a change in the resistance of the resistive strip.

In an even further example, a method can include applying a voltage to a bridge circuit that can include a plurality of branches that can have a plurality of resistors. The bridge circuit can generate an output voltage at output terminals. A conductive material layer of a tire can correspond to one of the plurality of resistors of a branch. The output voltage at the output terminals can be a function of parameters that can include a voltage applied to the bridge circuit and a resistance of the conductive material layer. The method can further include monitoring for a change in the output voltage from a given voltage value to another voltage value at the output terminals. The change in the output voltage at the output terminals can be indicative of a change in the resistance of the conductive material layer. The method can further include generating a signal in response to detecting the change in the output voltage to provide an indication of the change in the resistance of the conductive material layer of the tire.

BRIEF DESCRIPTION OF THE DRAWINGS

FIG. 5 depicts an example of a flow diagram illustrating a method for monitoring a tire for a puncture.

DETAILED DESCRIPTION

This disclosure relates to systems and methods for monitoring a tire for a puncture based on a change in a voltage established based at least on a change in a resistance of a conductive material layer disposed within the tire. The monitored voltage over time can be evaluated according to the systems and methods described herein to provide an indication, for example, to a vehicle operator, that a foreign object is in contact with the conductive layer. In one example, the tire can include a plurality of material layers. The conductive material layer can be positioned between two of the plurality of material layers. The foreign object can puncture the tire such that the foreign object perforates through at least one material layer and the conductive material layer.

A cross-sectional area of the conductive material layer can be transformed when the foreign object perforates the conductive material layer. Transforming the cross-sectional area of the conduct layer can change the resistance of the conductive material layer. The systems and methods described herein can monitor for the change in the resistance of the conductive material layer by monitoring for a change in an output voltage across output terminals of a bridge circuit that can be a function of parameters that can include the resistance of the conductive material layer. Furthermore, systems and methods are described herein that can monitor a tire for the puncture by monitoring for a change in a voltage over time in a resistive strip based on a change in a resistance of the resistive strip disposed on a material layer of a tire. The monitored voltage over time of the resistive strip can be evaluated according to the systems and methods described herein to provide an indication, for example, to the vehicle operator, that the tire has been punctured with the foreign object.

Figure 2:
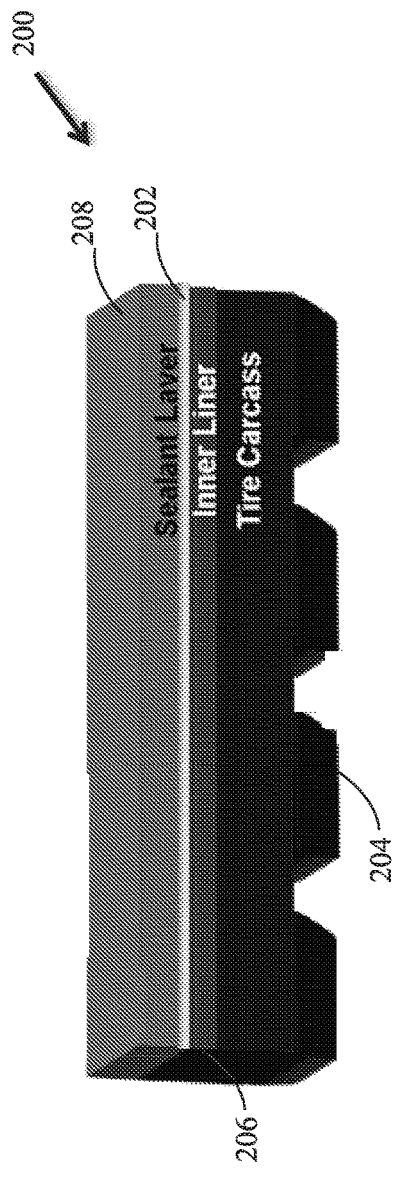
FIG. 2 illustrates an example of a self-sealing tire that the system of FIG. 1 can monitor for a puncture.
Figure 3:
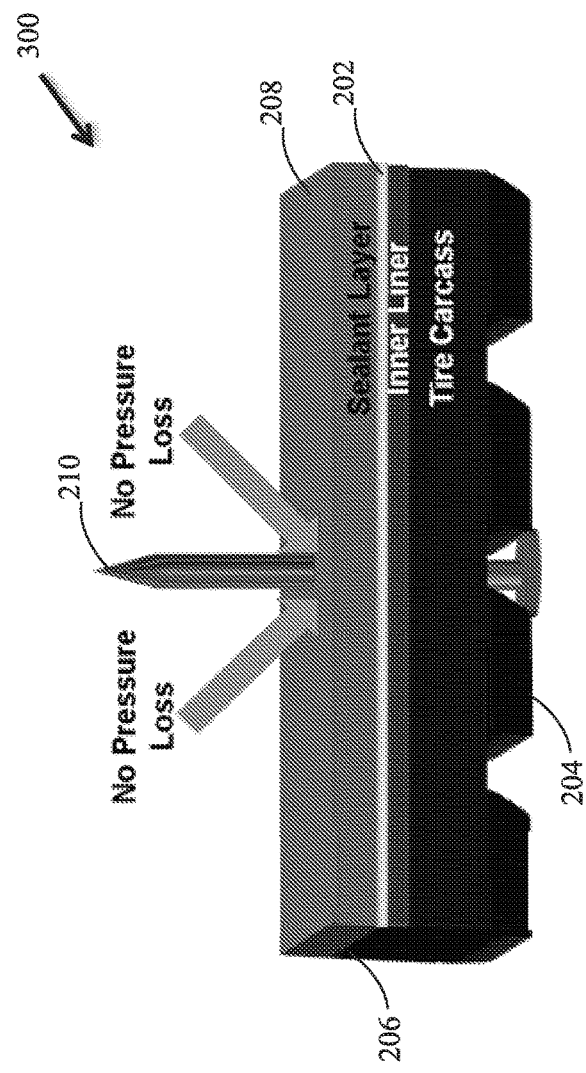
FIG. 3 illustrates an example of a self-sealing tire punctured with a foreign object.

Moreover, the systems and methods described herein can be implemented with any pneumatic tire having a conductive material layer. Thus, the examples described herein should not be construed as limited to a particular pneumatic tire, such as a self-sealing tire, as illustrated in FIGS. 2 and 3. Furthermore, the systems described herein can be integrated into an integrated circuit (IC) or can be provided as a standalone circuit element (or standalone elements) that can be mounted on a surface of a printed circuit board (PCB).

Figure 1:
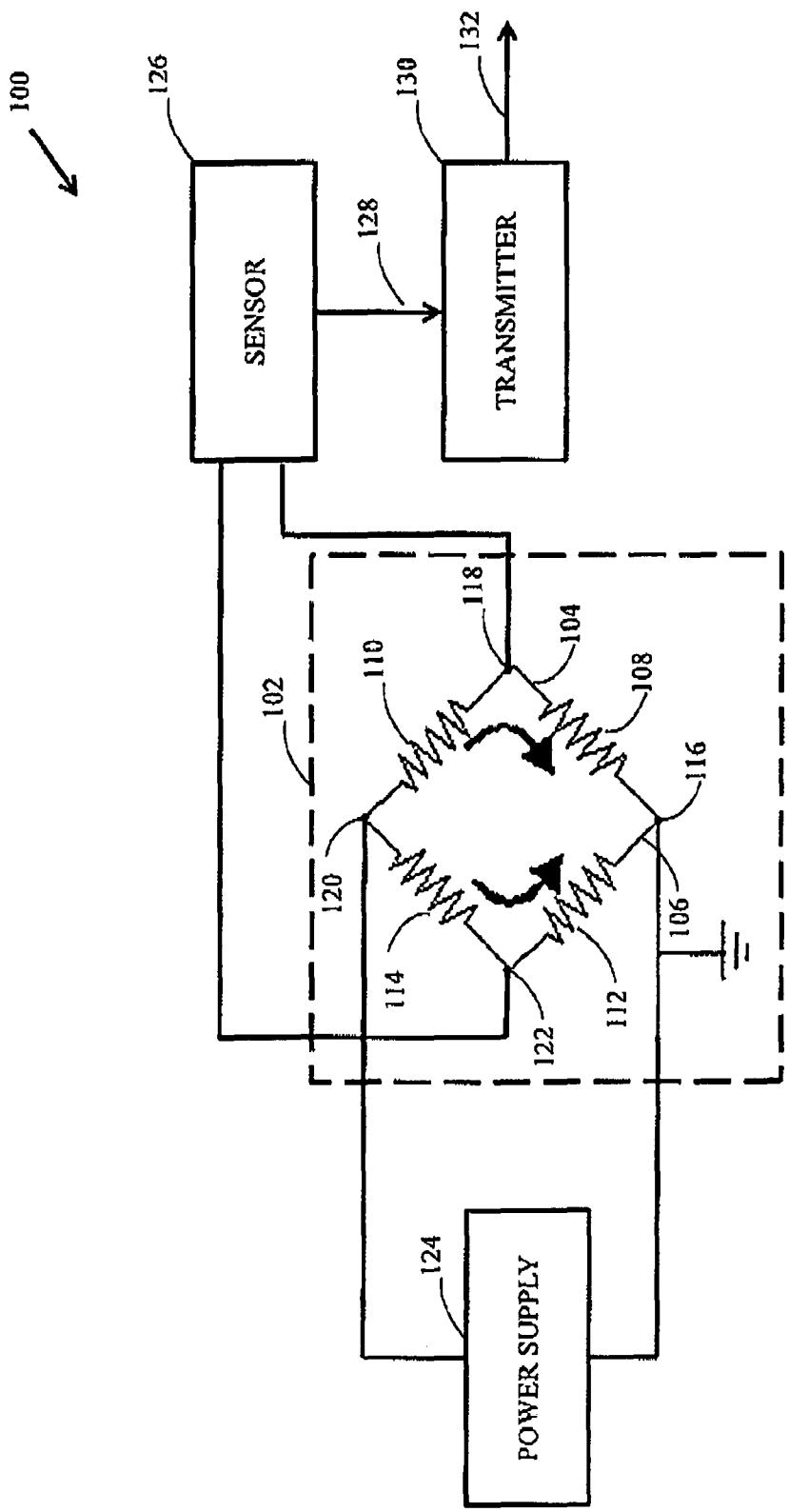
FIG. 1 illustrates an example of a system for monitoring a tire for a puncture.

FIG. 1 illustrates an example of a system 100 that can monitor a tire for a puncture. The system 100 can include a bridge circuit 102. The bridge circuit 102 can be a Wheatstone bridge circuit. The bridge circuit 102 can include a plurality of branches. In one example, the bridge circuit 102 can include a first branch 104 and a second branch 106. Each branch can include a plurality of resistors. The first branch 104 can include a first resistor 108 and a second resistor 110, and the second branch 106 can include a third resistor 112 and a fourth resistor 114.

The first resistor 108 can have a first resistance ($R_1$), and the second resistor can have a second resistance ($R_2$). The third resistor can have a third resistance ($R_3$), and the fourth resistor can have a fourth resistance ($R_4$). The first resistor 108 can be coupled between a ground terminal 116 and a first output terminal 118 of the bridge circuit 102. The second resistor 110 can be coupled between a supply terminal 120 and the first output terminal 118. The third resistor 112 can be coupled between the ground terminal 116 and second output terminal 122. The fourth resistor 114 can be coupled between the second output terminal 122 and the supply terminal 120.

The first resistor 108 in FIG. 1 can correspond to a conductive material layer of a tire. Thus, the first resistor 108 can be the conductive layer of the tire and can have the first resistance ($R_1$). In one example, the tire can be a self-sealing pneumatic tire 200, such as illustrated in FIG. 2, and the conductive material layer 202 of the self-sealing pneumatic tire 200 corresponds to the first resistor 108. The conductive material layer 202 can be integrated into the first branch 104 of the bridge circuit 102. For example, a set of conductive wires (not shown in FIGS. 1 and 2) can couple respective portions of the conductive material layer 202 to the ground terminal 116 and to the first output terminal 118 of the bridge circuit 102, respectively, to form a closed-loop circuit with the conductive material layer 202, and thus, integrating the conductive material layer 202 into the bridge circuit 102. Forming the closed-loop circuit allows current to flow through the conductive material layer 202, and thus, establish a voltage across the conductive material layer 202. The conductive material layer 202 can be a metal material layer, such as aluminum, copper, a mixture of the two, or the like.

The self-sealing pneumatic tire 200 of FIG. 2 can include a plurality of material layers. For example, the self-sealing pneumatic tire 200 can include the conductive material layer 202, a tire carcass material layer 204, an inner liner material layer 206, and a sealant material layer 208. The conductive material layer 202 can be disposed between the inner liner material layer 206 and the sealant material layer 208. Although illustrated in FIG. 2 as having only four material layers, the self-sealing pneumatic tire 200 can include any number of material layers. Thus, the self-sealing pneumatic tire 200 of FIG. 2 should not be construed as only having four material layers. For example, the self-sealing pneumatic tire 200 can further include a belt material layer and a body-ply layer.

FIG. 3 illustrates an example of the self-sealing pneumatic tire 200 of FIG. 2 punctured with a foreign object 210. As shown in FIG. 3, the foreign object 210 can puncture the self-sealing pneumatic tire 200 such that the foreign object 210 perforates through the tire carcass material layer 204, the inner liner material 206, and the conductive material layer 202 to the sealant material layer 208. In response, the sealant material layer 208 can seal the puncture, staving off a flat tire, and thereby, resulting in a negligible loss of pressure in the self-sealing pneumatic tire 200. In the example of FIG. 3, the foreign object 210 is a nail. However, the foreign object 210 can be any object that can penetrate the self-sealing pneumatic tire 200 to the conductive material layer 202. For example, the foreign object 210 can be a piece of a wire, a razor, a blade, broken glass, wood, or the like.

The foreign object 210 can puncture the self-sealing pneumatic tire 200 such that the foreign object can perforate through the conductive material layer 202. A cross-sectional area of the conductive layer can be transformed when the foreign object 210 can perforate the conductive material layer 202. Transforming the cross-sectional area of the conduct material layer 202 can change the resistance of the conductive layer 202. In one example, when the foreign object 210 perforates the conductive material layer 202 and remains lodged in the conductive material layer 202, the conductive material layer 202 can increase in resistivity from the additional resistivity of the foreign object 210. In this example, the foreign object 210 can have a given resistance, and when lodged in the conductive material layer 202, contributes to an overall resistivity of the conductive material layer 202.

The resistance of the conductive material layer 202 can be defined as $R=(\rho L)/A$, wherein p is an electrical resistivity of the conductive material layer 202 measured in ohm-meters ($\Omega \cdot m$), L is a length of the conductive material layer 202 measured in meters (m), and A is the cross-sectional area of the conductive material layer 202 measured in square-meters ($m^2$). Puncturing the conductive material layer 202 with the foreign object 210, such as illustrated in FIG. 3, can transform the cross-sectional area of the conductive layer 202, and thus, the resistivity of the conductive material layer 202. The change in the resistivity of the conductive material layer 202 can be measured according to the systems and methods described herein to provide an indication that the tire has been punctured.

The system 100 of FIG. 1 can further include a power supply 124. In one example, the power supply 124 can be enabled (e.g., turned-on) in response to an enabling signal (not shown in FIG. 1). The power supply 124 can be coupled to the ground terminal 116 and the supply terminal 120. The power supply 124 can be configured to apply a supply voltage at the supply terminal 120. A bridge output voltage ($V_{out}$) can be established across first and second output terminals 118 and 122. The bridge output voltage ($V_{out}$) can be a function of a difference in voltage at the first output terminal 118 and the voltage at the second output terminal 122. The voltage at the second output terminal 122 can be a function of the resistance ($R_3$) of the third resistor 112, the resistance ($R_4$) of the fourth resistor 114, and the supply voltage ($V_s$). The voltage at the first output terminal 118 can be a function of the resistance ($R_1$) of the conductive material layer 202, the resistance ($R_2$) of the second resistor 110 and the supply voltage ($V_s$). Thus, a change in the resistance ($R_2$) of the conductive material layer 202 can change the bridge output voltage ($V_{out}$) established across the first and second output terminals 118 and 122.

In one example, the bridge circuit 102 can be balanced such that a ratio of the resistances of the conductive layer ($R_2/R_1$) of the first branch 106 can be substantially equal to a ratio of the resistances ($R_4/R_3$) of the second branch 108. In this example, the voltage at the first output terminal 118 of the first branch 106 can be equal to the voltage at the second output terminal 122 of the second branch 108. Thus, the bridge output voltage ($V_{out}$) established across the first and second output terminals 118 and 122 can be substantially equal to zero volts (V). In another example, the bridge circuit can be unbalanced such that the ratio of the resistances of the conductive layer ($R_2/R_1$) of the first branch 106 is not substantially equal to the ratio of the resistances ($R_4/R_3$) of the second branch 108. In this example, the bridge output voltage ($V_{out}$) established across the first and second output terminals 118 and 122 can be equal to a given voltage value.

The system 100 of FIG. 1 can further include a sensor 126. The sensor 126 can be coupled to the first and second output terminals 118 and 122. The sensor 126 can be configured to monitor the bridge output voltage ($V_{out}$). The sensor 126 can be configured to monitor for a change in the bridge output voltage from a given voltage value to another voltage value. As mentioned, a change in the resistance ($R_2$) of the conductive material layer 202, for example, in response to the foreign object 210 perforating the conductive material layer 202, can change the bridge output voltage ($V_{out}$) established across the first and second output terminals 118 and 122.

The sensor 126 can be configured to generate a signal 128 indicative of the foreign object 210 being in contact with the conductive layer based on an evaluation of the bridge output voltage ($V_{out}$) over time. Thus, the signal 128 can be indicative that foreign object 210 has punctured the self-sealing pneumatic tire 200. For example, the sensor 126 can be configured to generate the signal 128 based on an evaluation of one of the given voltage value or the other voltage value relative to a threshold value. The sensor can be configured to generate the signal 128 based on one of the given voltage value and the other voltage value being either greater than the threshold value or less than the threshold value. Additionally or alternatively, the sensor 126 can be configured to generate the signal 128 based on one of the given voltage value and the other voltage value being one of greater than the threshold value or less than the threshold value by a defined percentage, for example, by 5%.

In another example, the sensor 126 can be configured to determine an output voltage difference value representative of a difference between the given voltage value and the other voltage value over time. The sensor 126 can be configured to generate the signal 128 indicative of the foreign object being in contact with the conductive material layer 202 based on a result of a comparison between the output voltage difference value relative to a threshold voltage difference value. Additionally or alternatively, the sensor 126 can be configured to generate the signal 128 based on the output voltage difference value being one of greater than the threshold voltage difference value or less than the threshold voltage difference value by a defined percentage, for example, by 5%.

In one example, the sensor 126 can be configured to one of periodically and continuously monitor for the change in the bridge output voltage ($V_{out}$) over time. The sensor 126 can be configured to select a monitoring mode (e.g., periodic or continuous) based on environmental data associated with an environmental condition, such as a terrain condition, weather condition, and/or temperature condition. For example, in wet weather conditions, it can be more desirable to monitor for the change in the bridge output voltage ($V_{out}$) over time continuously rather than periodically, such as in dry weather conditions, so that a vehicle operator can be more quickly notified that the foreign object 210 has punctured the tire, such as the self-sealing pneumatic tire 200.

In a further example, the conductive material layer 202 can be used as a strain gauge. The conductive material layer 202 can be used to infer an amount of applied force to the self-sealing pneumatic tire 200. In this example, the sensor 126 can be configured to monitor the bridge output voltage ($V_{out}$) across the first and second output terminals 118 and 122 such that an amount of applied force can be determined for the conductive material layer 202. During normal operations of the self-sealing pneumatic tire 200, the conductive material layer 202 can compress or tense, where either change can result in a change in electrical resistance in the conductive material layer 202 (e.g., in an increase in electrical resistance). The amount of force applied to the conductive material layer 202 can be computed by monitoring changes in the bridge output voltage ($V_{out}$), which can be a function of the resistance of the conductive material layer 202. Thus, the bridge circuit 202 can in this example operate as a strain gauge bridge circuit and can provide an indication of measured strain by a degree of imbalance in the bridge output voltage ($V_{out}$) across the first and second output terminals 118 and 122.

With no force applied, the bridge circuit 202 can be balanced such that the bridge output voltage ($V_{out}$) can be substantially zero volts. Zero volts can represent that zero is acting upon the strain gauge (e.g., the conductive material layer 202), and thus, zero force is acting upon the self-sealing pneumatic tire 200. As the conductive material layer 202 is either compressed or tensed, the resistance of the conductive material layer 200 can increase or decrease, respectively, thus unbalancing the bridge circuit 202. The sensor 128 can be configured to monitor the bridge output voltage ($V_{out}$) of the bridge circuit 202 during compression or tension of the conductive material and generate signals representative of the force that is acting upon the conductive material layer 202.

The system 100 can further include a transmitter 130. The transmitter 130 can be configured to transmit a notification signal 132 to an external system (or device) to notify a vehicle operator that the foreign object 210 is in contact with the conductive material layer 202 based on the signal generated by the sensor 126. The transmitter 130 can transmit the notification signal to an on-board system of the vehicle (not shown in FIG. 1) to alert the vehicle operator that the foreign object 210 has punctured the tire. The transmitter 130 can transmit the notification signal 132 over a wired and/or wireless communication medium. Thus, the transmitter 130 can be configured with either wired communication circuitry, wireless communication circuitry, or both. Accordingly, the system 100 can alert the vehicle operator that a tire has been punctured based on changes in resistance of a conductive material layer disposed in the tire by evaluating a voltage that is a function of at least the resistance of the conductive material layer.

Figure 4:
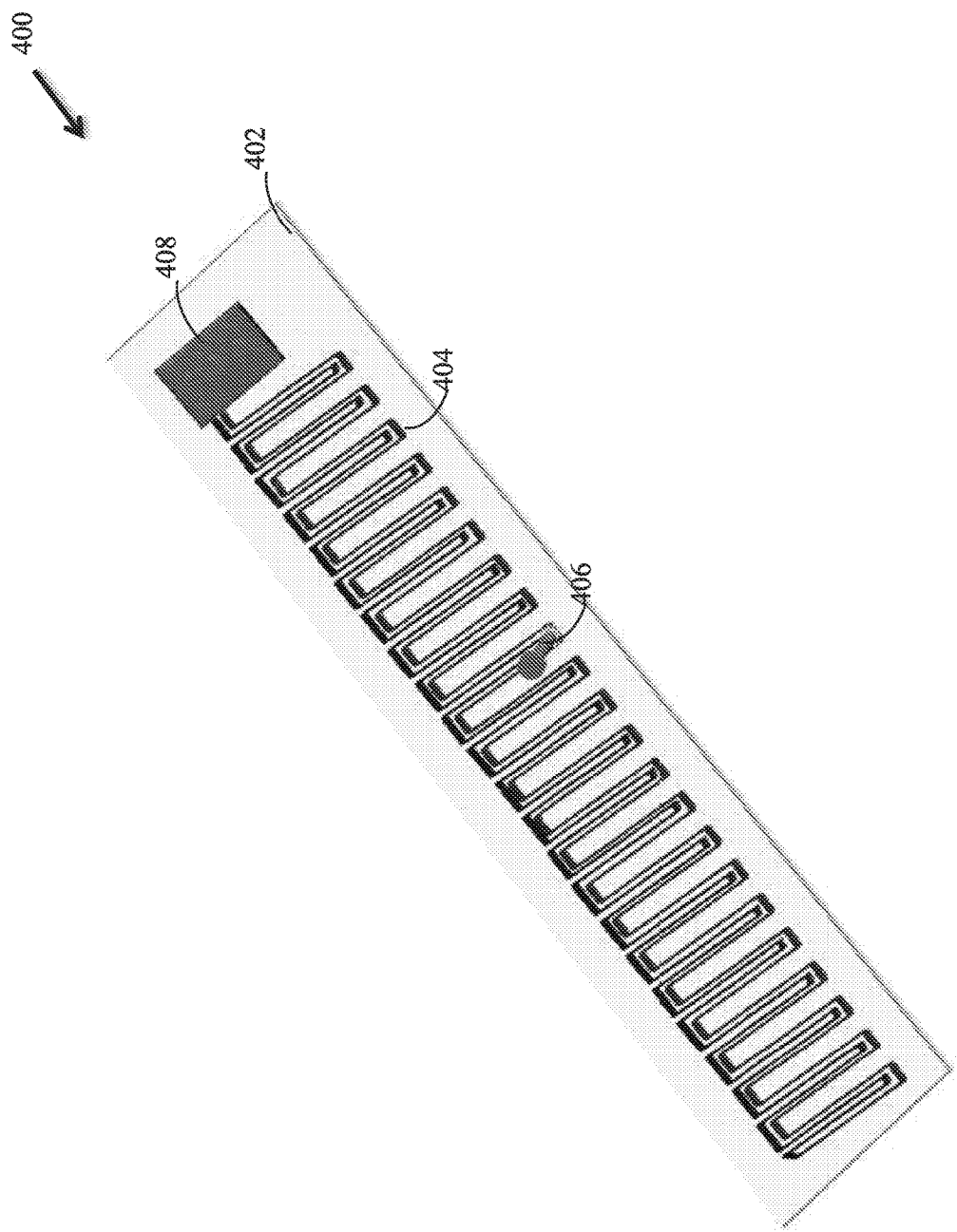
FIG. 4 illustrates another example of a system for monitoring a tire for a puncture.

FIG. 4 illustrates an example of another system 400 that can monitor a tire for a puncture. The system 400 can be disposed on a material layer 402 of a tire, such as the self-sealing pneumatic tire 200, as illustrated in FIG. 2. In one example, the system 400 can include the material layer 402 of the tire. The system can include a resistance strip 404. A change in the resistance of the resistive strip 404 can be evaluated to generate a signal indicative of the change in the resistance of the resistive strip. The change in the resistance of the resistive strip 404 can be, for example, in response to a foreign object 406 making contact with the resistive strip 404, as illustrated in FIG. 4. In one example, the foreign object 406 perforates the resistive strip 404. The foreign object 406 can correspond to the foreign object 210, as illustrated in FIG. 2.

The system 400 can include a monitoring device 408. The monitoring device 408 can include a sensor (not shown in FIG. 4) that can be configured to monitor for a change in the voltage in the resistive strip 404. The change in the voltage in the resistive strip 404 can be indicative of a change in the resistance of the resistive strip 404. The monitoring device 408 can further include a power supply and a transmitter (not shown in FIG. 4). The power supply can be configured to apply a voltage to the resistive strip 404 to establish a voltage in the resistive strip 404. The monitoring device 408 can be configured to generate the signal indicative of the foreign object 406 based on an evaluation of the change in voltage over time in the resistive strip 404 from a given voltage value to another voltage value.

For example, the sensor can be configured to generate the signal based on an evaluation of one of the given voltage value or the other voltage value relative to a threshold value. The sensor can be configured to generate the signal based on one of the given voltage value and the other voltage value being either greater than the threshold value or less than the threshold value. Additionally or alternatively, the sensor can be configured to generate the signal based on one of the given voltage value and the other voltage value being one of greater than the threshold value or less than the threshold value by a defined percentage, for example, by 5%.

In another example, the sensor can be configured to determine an output voltage difference value representative of a difference between the given voltage value and the other voltage value. The sensor can generate the signal indicative of the foreign object 406 being in contact with the resistive strip 404 based on a result of a comparison between the output voltage difference value relative to a threshold voltage difference value. Additionally or alternatively, the sensor can be configured to generate the signal based on the output voltage difference value being one of greater than the threshold voltage difference value or less than the threshold voltage difference value by a defined percentage, for example, by 5%. In one example, the sensor can be configured to one of periodically and continuously monitor for the change in the voltage over time. The sensor can be configured to select a monitoring mode (e.g., periodic or continuous) based on environmental data associated with an environmental condition, such as a terrain condition, weather condition and/or temperature condition.

The resistive strip 404 can include a plurality of resistive portions arranged along a length of the material layer 402, as illustrated in FIG. 4, to form a closed loop circuit with the power supply of the monitoring device 408. A pair of the plurality of resistive portions can be coupled at one end to respective terminals of the power supply. As illustrated in FIG. 4, the plurality of resistive portions can be arranged in a given pattern such that the given pattern maximizes a surface area of the material layer 402 of the tire.

The transmitter can be configured to transmit a notification signal to an external system to notify a user that the foreign object 406 is in contact with the resistive strip 404 based on the signal generated by the sensor. For example, the transmitter can be configured to transmit the notification signal to an on-board system of the vehicle (not shown in FIG. 4) to alert the vehicle operator that the foreign object 406 has punctured the tire. The transmitter can transmit the notification signal over a wired and/or wireless communication medium. Thus, the transmitter can be configured with either wired communication circuitry, wireless communication circuitry, or both. Accordingly, the system 400 can alert the vehicle operator that a tire has been punctured based on changes in resistance of a resistive strip disposed on a material layer of the tire by evaluating a voltage that is a function of at least the resistance of the resistive strip.

In view of the foregoing structural and functional features described above, a method that can be implemented will be better appreciated with reference to FIG. 5. While, for purposes of simplicity of explanation, the method of FIG. 5 is shown and described as executing serially, it is to be understood and appreciated that such method is not limited by the illustrated order, as some aspects could, in other embodiments, occur in different orders and/or concurrently with other aspects from that shown and described herein. Moreover, not all illustrated features may be required to implement a method. The method or portions thereof can be implemented as instructions stored in one or more non-transitory storage media as well as be executed by a processing resource (e.g., one or more processor cores) of a sensor, for example.

FIG. 5 depicts an example of a flow diagram illustrating a method for monitoring a tire (e.g., the self-sealing pneumatic tire 200, as illustrated in FIGS. 2-3) for a puncture. The method can include, at 502, applying a voltage to a bridge circuit (e.g., the bridge circuit 102, as illustrated in FIG. 1) that can include a plurality of branches that can have a plurality of resistors. The bridge circuit can establish an output voltage across output terminals (e.g., the first and second output terminals 118 and 122, as illustrated in FIG. 1). A conductive material layer (e.g., the conductive material layer 202, as illustrated in FIGS. 1-3) of the tire can correspond to a given resistor of a corresponding branch. The output voltage at the output terminals can be a function of parameters that can include a voltage applied to the bridge circuit and a resistance of the conductive material layer. At 504, the method can further include monitoring for a change in the output voltage from a given voltage value to another voltage value over time at the output terminals. The change in the output voltage at the output terminals can be indicative of a change in the resistance of the conductive material layer corresponding to a puncture in the tire. At 506, the method can further include generating a signal (e.g., the signal 128, as illustrated in FIG. 1) in response to detecting the change in the output voltage to provide an indication that the resistance of the conductive material layer of the tire has changed.

It is noted that the terms "substantially" and "about" may be utilized herein to represent an inherent degree of uncertainty that can be attributed to any quantitative comparison, value, measurement, or other representation. These terms are also utilized herein to represent a degree by which a quantitative representation may vary from a stated reference without resulting in a change in the basic function of the subject matter at issue.

What have been described above are examples. It is, of course, not possible to describe every conceivable combination of components or methods, but one of ordinary skill in the art will recognize that many further combinations and permutations are possible. Accordingly, the disclosure described herein is intended to embrace all such alterations, modifications, and variations that fall within the scope of this application, including the appended claims.

What is claimed is:
1. A system comprising:
a tire having a conductive material layer;
a bridge circuit comprising a plurality of branches having a plurality of resistors and configured to generate an output voltage at output terminals, wherein the conductive material layer of the tire corresponds to one of the plurality of resistors of a branch of the plurality of branches, and wherein the output voltage at the output terminals is a function of parameters comprising a voltage applied to the bridge circuit and a resistance of the conductive material layer, and a change in the output voltage at the output terminals is indicative of a change in the resistance of the conductive material layer; and
a sensor configured to monitor for the change in the output voltage at the output terminals of the bridge circuit, wherein the sensor is configured to generate a signal indicative of a foreign object being in contact with the conductive layer based on an evaluation of the output voltage over time,
wherein the foreign object being in contact with the conductive material layer corresponds to the foreign object puncturing a side of the conductive material layer and changing a cross-sectional area of the conductive material layer, and
wherein the change in the cross-sectional area of the conductive material layer changes the resistance of the conductive material layer.

2. The system of claim 1, wherein the sensor is configured to monitor for the change in the output voltage from a given voltage value to another voltage value.

3. The system of claim 2, wherein the sensor is configured to one of periodically and continuously monitor for the change in the output voltage at the output terminals of the bridge circuit.

4. The system of claim 3, wherein the sensor is configured to select one of the periodic and continuous monitoring for the change in the output voltage at the output terminals based on environmental data associated with an environmental condition.

5. The system of claim 2, wherein the sensor is configured to determine an output voltage difference value representative of a difference between the given voltage value and the other voltage value and generate a signal indicative of a foreign object being in contact with the conductive material layer based on a result of a comparison between the output voltage value relative to a threshold voltage difference value.

6. The system of claim 2, wherein the bridge circuit is a Wheatstone bridge circuit.

7. The system of claim 1, further comprising a transmitter configured to transmit a notification signal to one of a device or another system to notify a user that the foreign object is in contact with the conductive layer based on the signal generated by the sensor.

8. The system of claim 1, wherein the sensor is configured to generate the signal based on an evaluation of one of the given voltage value and the other voltage value relative to a threshold value.

9. The system of claim 8, wherein the sensor is configured to generate the signal based on one of the given voltage value and the other voltage value being one of greater than the threshold value and less than the threshold value.

10. The system of claim 1,
wherein the conductive material layer is disposed between at least two other layers of the tire comprising a sealant material layer and an inner liner material layer;
wherein the conductive material layer corresponds to an aluminum backing on the sealant material layer.

11. The system of claim 1, wherein the foreign object is a non-metallic material.

12. The system of claim 1, wherein the foreign object is one of a broken glass and a wood.

13. The system of claim 1, wherein the conductive material layer is a strain gauge.

14. A method comprising:
applying a voltage to a bridge circuit comprising a plurality of branches having a plurality of resistors to generate an output voltage at output terminals of the bridge circuit,
wherein a conductive material layer of a tire corresponds to one of the plurality of resistors of a branch of the plurality of branches, and wherein the output voltage at the output terminals is a function of parameters comprising a voltage applied to the bridge circuit and a resistance of the conductive material layer, and a change in the output voltage at the output terminals is indicative of a change in the resistance of the conductive material layer;
monitoring for a change in the output voltage from a given voltage value to another voltage value at the output terminals, wherein a sensor is configured to monitor for the change; and
generating a signal in response to detecting the change in the output voltage to provide an indication of the change in the resistance of the conductive material layer;
wherein the change in the resistance of the conductive material layer corresponds to a foreign object being in contact with the conductive material layer,
wherein the foreign object being in contact with the conductive material layer corresponds to the foreign object puncturing a side of the conductive material layer and changing a cross-sectional area of the conductive material layer, and
wherein the change in the cross-sectional area of the conductive material layer changes the resistance of the conductive material layer.

15. The method of claim 14,
wherein generating the signal in response to the detecting the change in the output voltage comprises one of:
generating the signal based on a result of a comparison between a difference between the given voltage value and the other voltage value relative to a threshold voltage difference value; and
generating the signal based on the result of the comparison between one of the given voltage value and the other voltage value relative to a threshold voltage value.

16. The method of claim 14, wherein the foreign object is a non-metallic material.

17. The method of claim 10, wherein the foreign object is one of a broken glass and a wood.

18. The method of claim 14, wherein the conductive material layer is a strain gauge.

* * * * *